United States Patent
Chen et al.

(10) Patent No.: US 7,861,556 B2
(45) Date of Patent: Jan. 4, 2011

(54) METHOD AND APPARATUS FOR IMPULSIVELY SPINNING OPTICAL FIBER

(75) Inventors: Xin Chen, Corning, NY (US); Patrick J. Cimo, Corning, NY (US); Daniel W. Hawtof, Corning, NY (US); Ming-Jun Li, Horseheads, NY (US); Daniel A. Nolan, Corning, NY (US)

(73) Assignee: Corning Incorporated, Corning, NY (US)

(*) Notice: Subject to any disclaimer, the term of this patent is extended or adjusted under 35 U.S.C. 154(b) by 1539 days.

(21) Appl. No.: 10/397,490

(22) Filed: Mar. 26, 2003

(65) Prior Publication Data

US 2004/0168476 A1     Sep. 2, 2004

Related U.S. Application Data

(60) Provisional application No. 60/450,643, filed on Feb. 28, 2003.

(51) Int. Cl.
*C03B 37/023* (2006.01)

(52) U.S. Cl. ............... 65/377; 65/378; 65/381; 65/402

(58) Field of Classification Search ............ 65/377, 65/378, 381, 402
See application file for complete search history.

(56) References Cited

U.S. PATENT DOCUMENTS

| | | | |
|---|---|---|---|
| 5,298,047 A | 3/1994 | Hart, Jr. et al. | 65/3.11 |
| 5,704,960 A | 1/1998 | Evans et al. | 65/402 |
| 5,943,466 A | 8/1999 | Henderson et al. | 385/123 |
| 6,148,131 A | 11/2000 | Geertman | 385/123 |
| 6,189,343 B1 | 2/2001 | Cocchini et al. | 65/430 |
| 6,240,748 B1 | 6/2001 | Henderson et al. | 65/402 |
| 6,324,872 B1 | 12/2001 | Blaszyk et al. | 65/504 |
| 2001/0020374 A1 | 9/2001 | Roba et al. | 65/402 |
| 2002/0134114 A1 | 9/2002 | Orita | 65/504 |

FOREIGN PATENT DOCUMENTS

| | | |
|---|---|---|
| EP | 0 729 919 | 9/1996 |
| JP | 2001-342033 | 12/2001 |

OTHER PUBLICATIONS

S. C. Rashleigh, *Journal of Lightwave Technology*, LT-1:312-331, 1983.
A. Ashkin et al., *Applied Optics*, vol. 20, pp. 2299-2303, 1981.
M.J. Li et al., *Optics Letters*, vol. 23, pp. 1659-1661, 1998.
N. Gisin et al., "Polarization Mode Dispersion of short and long single-mode fibers", *Journal of Lightwave Technology*, vol. 9 (No. 7) p. 821-827 (1991).

*Primary Examiner*—John Hoffmann
(74) *Attorney, Agent, or Firm*—Joseph M. Homa; Svetlana Z. Short; Matthew J. Mason

(57) ABSTRACT

A method and apparatus for impulsively spinning optical fiber while the optical fiber is being drawn is disclosed herein.

11 Claims, 9 Drawing Sheets

METHOD AND APPARATUS FOR IMPULSIVELY SPINNING OPTICAL FIBER

CROSS-REFERENCE TO RELATED APPLICATIONS

This application claims the benefit of priority under 35 U.S.C. §119(e) of U.S. Provisional Application Ser. No. 60/450,643 filed on Feb. 28, 2003.

BACKGROUND OF THE INVENTION

1. Field of the Invention

The present invention relates to imparting spin to optical fiber, and more particularly to imparting spin to an optical fiber while the fiber is being drawn.

2. Technical Background

Light traveling in an optical fiber has two polarizations. For optical fibers that are perfectly circularly symmetric in both geometry and internal and applied stress, operation at a wavelength or in a wavelength range which is regarded as "single-moded" actually supports two orthogonal polarization modes, wherein the two polarization modes are degenerate, propagating with the same group velocity and having no time delay difference after traveling the same distance in the fiber. However, in practice, an optical fiber is not perfectly circularly symmetric. For example, imperfections such as geometric and form deformation and stress asymmetry break the degeneracy of the two modes. See, for example, Rashleigh, S.C., Journal of Lightwave Technology, LT-1:312-331, 1983. As a result, the two polarization modes propagate with different propagation constants $\beta_1$ and $\beta_2$. The difference between the propagation constants is termed birefringence $\Delta\beta$, the magnitude of the birefringence being given by the difference in the propagation constants of the two orthogonal modes:

$$\Delta\beta = \beta_1 - \beta_2 \qquad (1)$$

Birefringence causes the polarization state of light propagating in the fiber to evolve periodically along the length of the fiber. The distance required for the polarization to return to its original state is the fiber beat length $L_B$, which is inversely proportional to the fiber birefringence. In particular, the beat length $L_B$ is given by:

$$L_B = \frac{2\pi}{\Delta\beta} \qquad (2)$$

Accordingly, fibers with more birefringence have shorter beat lengths and vice versa. Commercial fibers exhibit a wide variety of beat lengths since the geometric and stress asymmetries of such fibers vary along the length of the fiber and between different fibers. Typical beat lengths observed in practice range from as short as 2-3 millimeters (a high birefringence fiber) to as long as 10-50 meters (a low birefringence fiber).

In addition to causing periodic changes in the polarization state of light traveling in a fiber, the presence of birefringence means that the two polarization modes travel at different group velocities, the difference increasing as the birefringence increases. The differential time delay or differential group delay (DGD) between the two polarization modes is called polarization mode dispersion, or PMD. PMD causes signal distortion, and thus PMD is very detrimental in high bit rate systems and analog communication systems. For a uniform linear birefringent fiber without perturbation, i.e. externally imposed perturbation, the PMD of the fiber typically grows linearly as the fiber length increases. However, in a longer length, random mode coupling is inevitably introduced into the fiber due to externally imposed perturbations, the PMD increase along the fiber is thus proportional to the square-root of the fiber length statistically.

Various attempts to reduce PMD have been made. Known methods of reducing PMD involves spinning the preform and/or the fiber during the fiber drawing process. The spinning causes the birefringence axis of the fiber to rotate along the fiber. By performing the spinning during drawing, i.e., when fiber is being drawn from a heated portion of the preform, the spin imparted to the fiber will tend to stay in the fiber even when the fiber is cooled. As used herein, "spinning" or "applying a spin" are distinguished from "twisting" the fiber during the post-draw stage after the fiber has cooled to temperatures substantially lower than the temperature of the fiber during draw. For example, twisted fibers will generally relax to a non-twisted state once an applied torque is released. In addition, due to mechanical stress, twisted fibers possess an elastic-optic effect making their PMD properties dramatically different from spun fibers.

Sinusoidal spin profiles have been used extensively to reduce the PMD of optical fibers. Currently, in production processes, the fiber PMD can be improved by a factor of 2 to 5 using such spin profiles, although much better PMD reduction is predicted by using certain spin parameters. To achieve a high degree of PMD reduction, the spin magnitude and spin period need to be precisely controlled. In known spin devices, the spin magnitude typically has a fluctuation of about ±0.5 turns/m from the specified spin profiles, wherein the resultant PMD is actually an average PMD over the region of fluctuation. On the other hand, sinusoidal spin profiles are most effective for optical fibers with relatively small intrinsic birefringence, typically fibers having a beatlength larger than a few meters. For optical fibers having a relatively large intrinsic birefringence, the PMD reduction from a specific spin profile is beatlength dependent. Furthermore, increasingly better PMD reduction is difficult to achieve because, for example, the fiber intrinsic birefringence is typically not uniform and/or the spin magnitude typically can not be controlled precisely enough.

A spatial spin function can be detected in a finished optical fiber by, for example, using near-field resonant backscattered light. See A. Ashkin et al., Applied Optics, Vol. 20, pages 2299-2303, 1981.

SUMMARY OF THE INVENTION

A method of producing an optical fiber from an optical fiber preform is disclosed herein comprising imparting an impulsive spin to the fiber as the fiber is being drawn. The impulsive spinning method is applicable to a wide range of fiber intrinsic birefringence.

In one preferred set of embodiments, the method comprises, while drawing the optical fiber from the optical fiber preform, imparting a spin to a plurality of selected portions of the fiber, the selected portions having a length less than one-tenth the beat length of the fiber, wherein the spin to each selected portion is imparted at a nonzero angular speed including a maximum nonzero angular speed, wherein the absolute magnitude of the difference between the maximum nonzero spin rate (or maximum nonzero angular speed) and the spin rate (or angular speed) at which a spin is imparted to the regions of the fiber immediately adjacent both ends of said selected portions is greater than 0.5 turns/meter, wherein each region immediately adjacent the ends of said selected portions has a length greater than twice the length of the selected portion.

In a preferred embodiment, each region immediately adjacent the ends of selected portions has a length less than 100 times the length of the selected portion. In another preferred embodiment, each region immediately adjacent the ends of selected portions has a length less than 20 meters.

In a preferred embodiment, the minimum absolute magnitude of the difference between the maximum nonzero spin rate and the spin rate at which a spin is imparted to at least one of the regions of the fiber immediately adjacent an end of a selected portion is greater than 1 turn/meter. More preferably, the minimum absolute magnitude of the difference between the maximum nonzero spin rate and the spin rate at which a spin is imparted to the regions of the fiber immediately adjacent both ends of respective selected portions is greater than 1 turns/meter.

In a preferred embodiment, the selected portions have lengths less than 0.5 meter. More preferably, the selected portions have respective lengths less than about 0.2 meter. Even more preferably, at least one selected portion has a respective length less than about 0.1 meter. In another preferred embodiment, the selected portions have lengths less than 0.05 meter.

In a preferred embodiment, the maximum nonzero spin rate imparted to the selected portions is greater than 2 turns/meter. More preferably, the maximum nonzero spin rate imparted to at least one selected portion is greater than 2 turns/meter.

In a preferred embodiment, the maximum nonzero spin rate imparted to the selected portions is greater than 2.5 turns/meter. More preferably, the maximum nonzero spin rate imparted to at least one selected portion is greater than 2.5 turns/meter.

In a preferred embodiment, the spin rate of the spin imparted to at least one of the regions immediately adjacent at least one of the selected portions is less than 1 turns/meter. In another preferred embodiment, the spin rate of the spin imparted to at least one of the regions immediately adjacent at least one of the selected portions is less than 0.5 turns/meter.

In one preferred embodiment, the spin rate of the spin imparted to at least one of the regions immediately adjacent at least one of the selected portions is zero. In another preferred embodiment, the angular speed or spin rate of the spin imparted to both regions immediately adjacent respective ends of at least one of the selected portions is zero.

In one preferred embodiment, at least two of the selected portions are spun at differing maximum nonzero angular speeds. In another preferred embodiment, at least two of the selected portions are spaced apart by at least 0.5 meters.

In one preferred embodiment, the selected portions are disposed at periodic intervals along the length of the fiber, preferably occurring at regular intervals along the length of the fiber. In another preferred embodiment, the selected portions are disposed intermittently along the length of the fiber, including selected portions which are not regularly spaced apart or selected portions which occur at irregular intervals. In yet another preferred embodiment, the selected portions are disposed sporadically along the length of the fiber, that is, occurring at infrequent intervals or in scattered instances. In still another preferred embodiment, the selected portions have respective random magnitudes, or randomly selected magnitudes, along the length of the fiber. With random magnitude, PMD may be reduced by shortening the intervals, wherein the interval corresponds to the mode coupling length. Preferably, the mode coupling length imposed on the optical fiber as disclosed herein is less than about 10 meters, more preferably less than about 5 meters, even more preferably less than about 1 meter. In preferred embodiments, an optical fiber is made according to the methods disclosed herein. In preferred embodiments, an optical fiber communication system comprises the optical fiber made according to the methods disclosed herein.

In a set of preferred embodiments, disclosed herein is an apparatus for impulsively spinning optical fiber as the optical fiber is being drawn from an optical fiber preform. The apparatus comprises: a lever member capable of pivoting about a pivot point, the lever member comprising a follower portion; a frictional contact member attached to the lever member, wherein the frictional contact member is adapted to frictionally engage the optical fiber while allowing the optical fiber to be drawn along the frictional contact member; and a rotatable shaft having a cam portion capable of engaging the follower portion, wherein rotation of the shaft causes the cam portion to come into and out of engagement with the follower portion of the lever member, thereby causing the lever member to pivot within an arc, thereby causing the frictional contact member to pivot within an arc transverse to a direction of travel of the optical fiber; whereby engagement of the cam portion with the follower portion is capable of causing the frictional contact member to impart spin to the optical fiber.

In a preferred embodiment, the frictional contact member pivots generally within the arc through which the lever member pivots.

Preferably, the apparatus further comprises a mount, wherein the lever member is pivotally attached to the mount at the pivot point.

Preferably, the frictional contact member is rotatably attached to the lever member.

In a preferred embodiment, the frictional contact member comprises a wheel having an outer surface adapted to engage the optical fiber. Preferably, the wheel is capable of imparting a spin to the optical fiber as the optical fiber rolls along the outer surface of the wheel. Preferably, an axis of the wheel is generally perpendicular to the direction of travel of the optical fiber.

The apparatus further preferably comprises a motor connected to, and adapted to drive, the rotatable shaft. Preferably, a motor controller connected to the motor. Preferably, the shaft is driven to at least one selected rotation. Preferably, the shaft is driven to at least one selected rotational speed. Preferably, the shaft is driven in at least one selected rotational direction.

Preferably, the rotatable shaft comprises a longitudinal section having a periphery comprised of the cam portion and a generally constant diameter portion, wherein the cam portion has a variable diameter. Preferably, the engagement between the follower portion and the generally constant diameter portion of the rotatable shaft imparts substantially no spin to the optical fiber.

In a preferred embodiment, the cam portion comprises a protrusion having a diameter greater than the diameter of the generally constant diameter portion.

In another preferred embodiment, the cam portion comprises an indentation having a diameter less than the diameter of the generally constant diameter portion.

In another preferred embodiment, the rotatable shaft comprises a plurality of cam portions. In yet another preferred embodiment, the plurality of cam portions comprises at least one protrusion and at least one indentation.

In some preferred embodiments, the angle subtending the cam portion in a plane perpendicular to the axis of the rotatable shaft is not greater than 45 degrees.

Reference will now be made in detail to the present preferred embodiments of the invention, examples of which are illustrated in the accompanying drawings. An exemplary embodiment of a segmented core refractive index profile in accordance with the present invention is shown in each of the figures.

DETAILED DESCRIPTION OF THE PREFERRED EMBODIMENT

Figure 1:
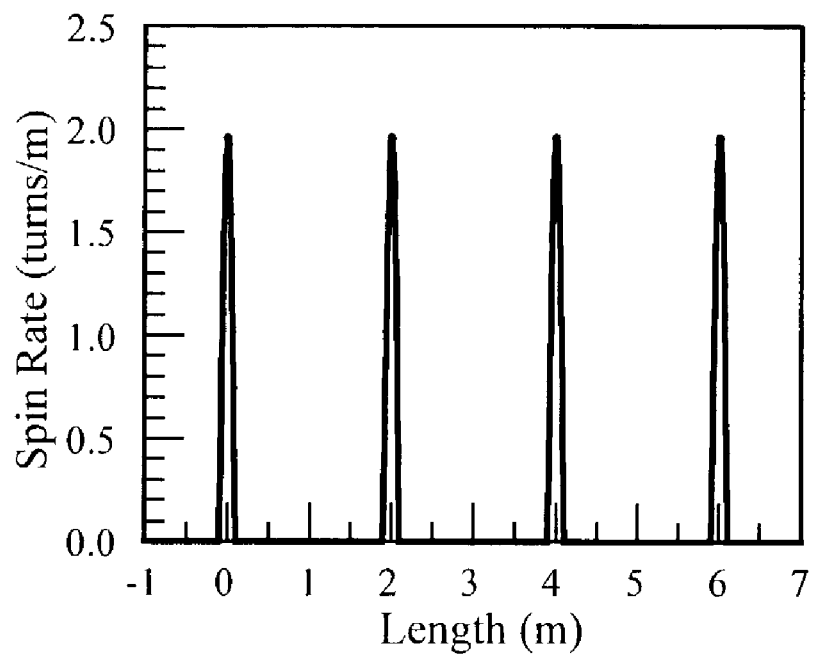
FIG. 1 shows an example of a spin profile (or spin rate profile) as disclosed herein, wherein the interval between two consecutive spinnings is 2 meters, and each impulsive spinning generates a rotation of 90 degrees.

Additional features and advantages of the invention will be set forth in the detailed description which follows and will be apparent to those skilled in the art from the description or recognized by practicing the invention as described in the following description together with the claims and appended drawings.

A waveguide fiber telecommunications link, or simply a link, is made up of a transmitter of light signals, a receiver of light signals, and a length of waveguide fiber or fibers having respective ends optically coupled to the transmitter and receiver to propagate light signals therebetween. The length of waveguide fiber can be made up of a plurality of shorter lengths that are spliced or connected together in end to end series arrangement. A link can include additional optical components such as optical amplifiers, optical attenuators, optical fiber isolators, optical switches, optical filters, or multiplexing or demultiplexing devices. One may denote a group of inter-connected links as a telecommunications system.

A span of optical fiber as used herein includes a length of optical fiber, or a plurality of optical fibers fused together serially, extending between optical devices, for example between two optical amplifiers, or between a multiplexing device and an optical amplifier. A span may comprise one or more sections of optical fiber as disclosed herein, and may further comprise one or more sections of other optical fiber, for example as selected to achieve a desired system performance or parameter such as residual dispersion at the end of a span.

The term "spin profile" (or "spin function") is used herein to describe spin rate as a function of distance z, i.e., $\alpha(z)$, or as a function of time t, i.e., $\alpha(z(t))$, the time spin function applied to a fiber being directly derivable from the corresponding distance spin function through the fiber draw rate, which is preferably constant but, in the general case, can be variable. As discussed more fully below, the spin function employed in producing a fiber, whether expressed as a function of distance or time, and the resulting spin function present in the finished fiber, expressed as a function of distance, are not in general identical because of, for example, mechanical effects, e.g., slippage, at the interface between the fiber and the apparatus used to apply the spin function to the fiber and/or preform. Thus, when we assess the PMD performance of the fibers imparted with the suggested spin, we also take process variations into considerations, which will be shown with more details below.

As used herein, spin rate is described in units of turns per meter, where, for example, 1 turn/meter=$2\pi$ radians per meter=360° per meter.

As used herein, the impulsive "spin" refers to the rotation of a portion of an optical fiber relative to another portion of the optical fiber, wherein the spin is imparted while the fiber is being drawn from an optical fiber preform, i.e. while the fiber is still at least somewhat heated and is capable of undergoing non-elastical rotational displacement and is capable of substantially retaining the rotational displacement after the fiber has fully cooled. In contrast, the impulsive "spin" is not imparted by rotation of an optical fiber after the fiber has fully cooled and typically been coiled onto a reel or spool.

Without being bound to any theory, the PMD properties of spun fiber can be described by coupled mode theory. See M. J. Li et al, Optics Letters, Vol. 23, pages 1659-1661, 1998. We have found that imparting a plurality of impulsive spins to an optical fiber while the fiber is being drawn can achieve good PMD performance in fibers if spin parameters can be properly chosen.

The electric field of a fiber with birefringent perturbation such as impulsive spinning can be represented by a linear combination of the electric field of two orthogonal polarization modes, $\vec{e}_x$ and $\vec{e}_y$, of an unperturbed fiber:

$$\vec{E}(x,y,z) = A_x(z)\exp(-i\beta z)\vec{e}_x + A_y(z)\exp(-i\beta z)\vec{e}_y \quad (3)$$

where $\beta$ is the propagation constant of the two polarization modes and the complex amplitudes $A_x(z)$ and $A_y(z)$ that describe the polarization change satisfy the coupled mode equation, $$\begin{pmatrix} \frac{dA_x}{dz} \\ \frac{dA_y}{dz} \end{pmatrix} = \begin{pmatrix} i\frac{\delta\beta}{2} & \alpha(z) \\ -\alpha(z) & -i\frac{\delta\beta}{2} \end{pmatrix} \begin{pmatrix} A_x \\ A_y \end{pmatrix} \quad (4)$$

where $\delta\beta$ is the birefringence of the fiber, which is linked to fiber beatlength $L_B$ in a simple form of $\delta\beta = 2\pi/L_B$, and $\alpha(z)$ is the fiber spin profile. The Jones matrix of the spun fiber can be obtained through solving the Eq.(4) for the initial condition of $A_x(0)=1$, and $A_y(0)=0$. The Jones matrix can further be constructed by using the solution $A_x$ and $A_y$, $$M(z) = \begin{pmatrix} A_x(z) & -A_y^*(z) \\ A_y(z) & A_x^*(z) \end{pmatrix} \quad (4)$$

Without being bound to any theory, the PMD of the spun fiber can be further calculated from the Jones matrix obtained above. The differential group delay (DGD) as a function of length can be expressed as, $$\tau(z) = 2\left(\left|\frac{dA_x(z)}{dz}\right|^2 + \left|\frac{dA_y(z)}{dz}\right|^2\right)^{\frac{1}{2}} \cdot z \quad (5)$$

To describe the PMD reduction, we define a parameter called the PMD reduction factor (PMDRF) as the ratio of the PMD of spun fiber ($\tau$) to that of the unspun fiber ($\tau_0$), i.e. PMDRF=$\tau/\tau_0$. Typically, PMD reduction factor is fiber length dependent. However, the PMD reduction factor approaches a constant value for longer fiber lengths, and this constant value can serve as a good gauge of the fiber PMD reduction performance for comparison purposes, wherein the coupled-mode equation can be integrated for a sufficiently long length so that the calculated PMD reduction factor is sufficiently close to the constant value.

The method disclosed herein comprises imparting an impulsive spin to an optical fiber as a function of time by applying appropriate forces to the fiber and/or the preform. An apparatus for applying such forces is described below. The temporal spin function applied to the fiber becomes translated into a spatial spin function in the fiber as the fiber is being drawn.

Preferably, a one-to-one correspondence between the applied spin function and the resulting spin function in the fiber is achieved. However, a one-to-one correspondence between the applied spin function and the resulting spin function in the fiber is not in all cases necessary, but a sufficient correspondence should be implemented, for example depending upon which apparatus is utilized to impart spin to the fiber during the draw process, such that sufficient reduction in PMD is achieved in the optical fiber even though the resultant spin imbued in the fiber may differ from the applied spin function. Unless otherwise noted herein, the spin, or spin function, and spin rate relate to the spin or spin rate actually observed in or actually imparted to the fiber. Furthermore, the applied spin rate corresponds to the relative change in spin between the optical fiber being drawn and the optical fiber preform from which the fiber is being drawn versus time (or versus distance along the length of the fiber, as described herein).

In a preferred embodiment, selected portions are impulsively spun at regular intervals along the length of a fiber. The maximal spacing intervals between impulsively spun sections of fiber preferably should be smaller than a distance of about 20 meters to achieve PMD reduction. Longer intervals can be used, although PMD performance can be complicated by the introduction of nonuniformity of the fiber birefringence over longer lengths.

FIG. 1 shows an example of such spin profile (or spin rate profile), where the interval between two consecutive spinnings is 2 meters, and each impulsive spinning generates a rotation of 90 degrees. In an ideal or theoretical situation, the impulsive spinning would implement a theoretically ideal impulse, i.e. the rotation of fiber happens instantly within zero distance or length along the fiber. In practice, the spinning always requires a finite distance to generate such a rotation, i.e. to impart a spin to the fiber. For example, we have produced spins that occur over a distance of about 1 to 2 cm depending upon such factors as draw speed. Preferably, the width of the impulse is as small as possible. Thus, the impulse could appear as a sharp spike or as a rounded bump, depending upon measurement resolution.

In modeling impulsive spinning, we approximated sharp spikes with a simple analytical function for the convenience of numerical simulation in order to demonstrate the principle. According to our numerical simulation, we consider an impulse at location $x_i$, $$\alpha_i = \alpha_{0i}\cos(w_i \cdot (x-x_i)) \quad (6)$$

where two parameters $\alpha_{0i}$ and $w_i$ are used to describe the impulse. The parameter $w_i$ represents the width of the impulse so that, for an impulse centered at $x_i$, the spinning starts at $x_i - w/2$, and ends at $x_i + w/2$. The parameter $\alpha_{0i}$ represents the maximum spin rate during the impulsive spinning, which can take either a positive value representing a clockwise rotation or a negative value representing a counter-clockwise rotation. The total rotation generated by the impulse is related to both $\alpha_{0i}$ and $w_i$ with the equation, $$R = \frac{2w_i\alpha_{0i}}{\pi}.$$

Thus, rotation can be adjusted by using any of the two parameters. The spin rate as a function of position (or the "spin profile") takes the following form $$\alpha(z) = \sum_{i=0}^{N}[\alpha_{0i} \cdot \cos(w_i \cdot (x-x_i))] \quad (7)$$

Figure 2:
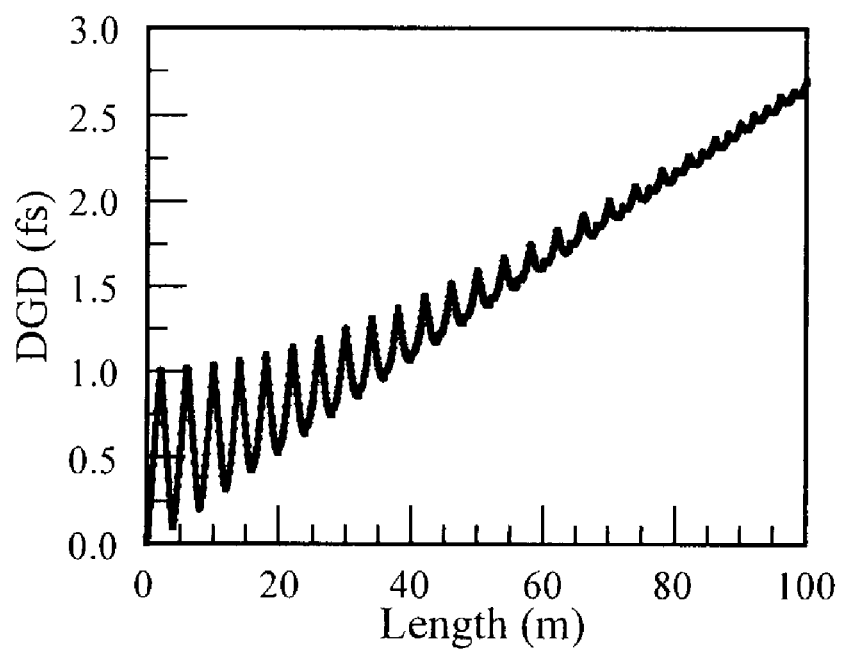
FIG. 2 shows the DGD as a function of fiber length for the fiber of FIG. 1.

In FIG. 1, the width of the impulse was chosen to be 0.2 m, and to achieve a rotation of 90 degrees, a maximum of 1.96 turns/m spin rate is needed. The DGD as a function of fiber length for the fiber of FIG. 1 is shown in FIG. 2 for a beatlength of 10 m. FIG. 2 shows that the DGD accumulated in the first segment (i.e. the first 2 meters) of fibers is largely canceled by the second segment of fiber. A local maximum DGD is achieved at the position just before the impulsive rotation. A local minimum DGD is achieved when the fiber is around 4 meters when the lengths of two fiber segments are equal (or substantially equal). In the subsequent evolution of DGD, the variation of the DGD within one fiber segment is reduced while the overall DGD increase follows a generally linearly increasing trend. Such a generally linear increase of fiber DGD results in a constant PMD reduction factor in a longer fiber length. Note that for a fiber with beatlength of 10 m, the DGD as a function of length without the involvement of spinning takes the form of DGD=0.517(fs/m)*z at a wavelength of 1550 nm. Thus in this case the PMD reduction factor is 0.052, which translates into a 19-fold reduction in PMD.

The impulsive spinning can be generated toward either direction (clockwise or counterclockwise as viewed facing the longitudinal axis of the fiber). In the example illustrated in FIG. 1, only "positive" spinning was used.

Figure 3:
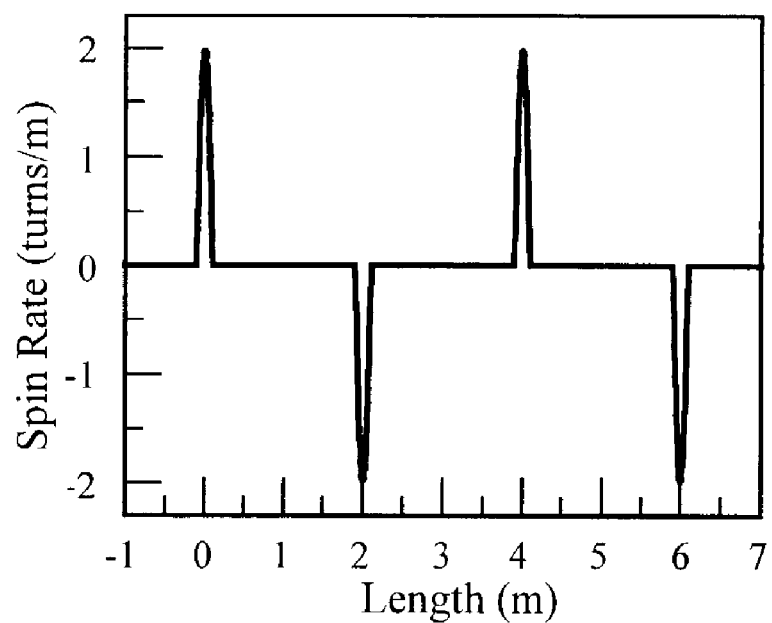
FIG. 3 shows both "positive" and "negative" impulsive spinning.
Figure 4:
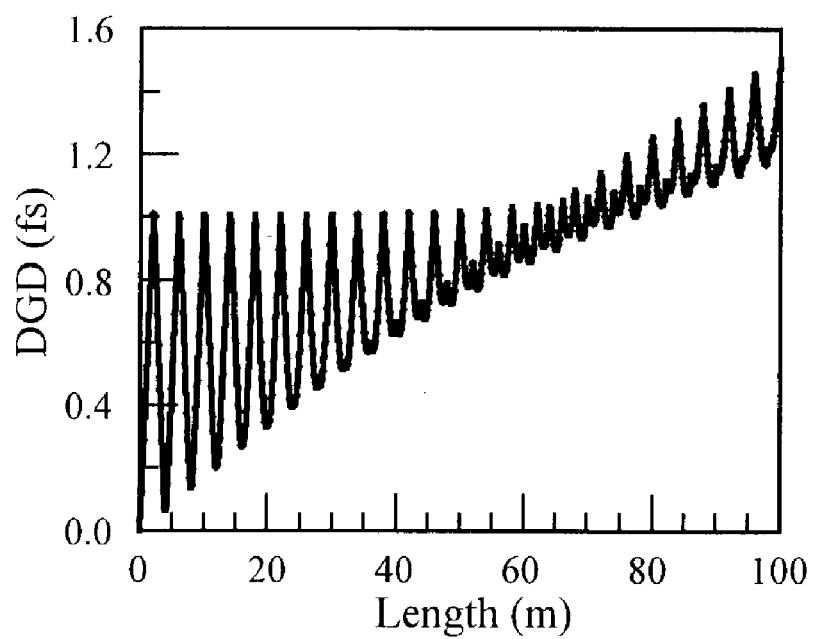
FIG. 4 shows the DGD evolution along the fiber of FIG. 3.

As another example, FIG. 3 shows both "positive" and "negative" impulsive spinning. The DGD evolution along the fiber of FIG. 3 is shown in FIG. 4. While the detailed DGD evolution of FIG. 4 is different from the case shown in FIG. 2, an even lower PMD reduction factor of 0.025 or a factor of 40 in PMD reduction could be achieved.

In actual processes, one or more spin parameters may fluctuate, such as the actual amount of rotation at each spin site along the fiber. In another example, a configuration similar to that in FIG. 1 was used except that the rotation induced by impulsive spinning was allowed to have a random variation of ±10% around 90 degrees or ¼ turns. The average PMD reduction factor calculated over 200 of such random instances was 0.06, which represents a factor of 16.7 improvement of PMD performance compared to unspun fiber.

In the examples above, a fiber beatlength of 10 m and a width of the impulse of 0.2 m were evaluated. Over a 0.2 m fiber length, only 7.2 degree of retardance was accumulated (which is close to the ideal of zero) Higher degrees of retardance are expected for cases of larger fiber birefringence or shorter fiber beatlength, wherein those cases could also benefit from impulsive spinning as disclosed herein.

Figure 5:
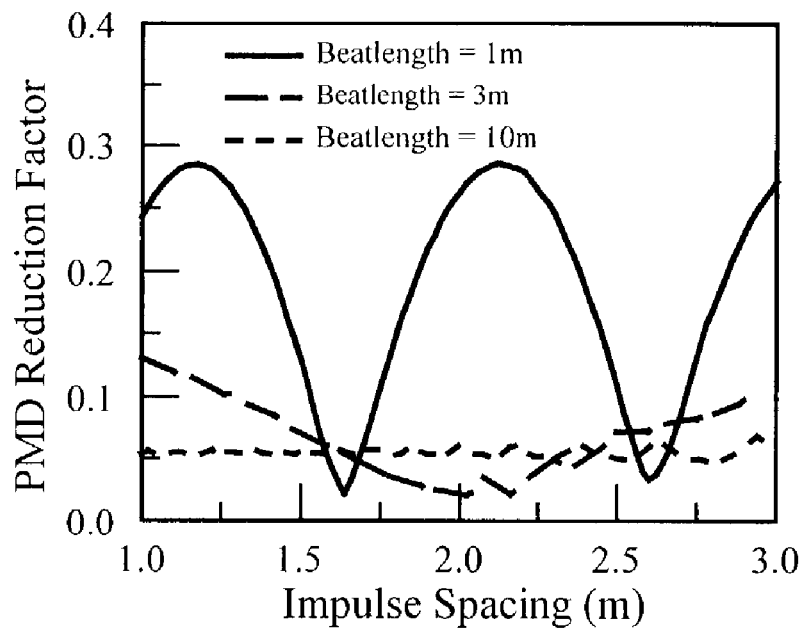
FIG. 5 shows the PMD reduction factor versus impulse spacing for beat lengths of 1 m, 3 m, and 10 m, using an impulsive rotation of 90 degrees with a fixed impulse width of 0.2 m.

FIG. 5 shows the PMD reduction factor versus impulse spacing for beat lengths of 1 m, 3 m, and 10 m, using an impulsive rotation of 90 degrees with a fixed impulse width of 0.2 m. As seen in FIG. 5, the PMD reduction factor had a stronger beatlength dependence for shorter beatlengths (e.g. 1.0 m beatlength as illustrated), i.e. where the birefringence change over the impulse width is bigger. Conversely, for longer beatlengths (here, e.g., 10 m), the dependence of PMD reduction factor on impulse spacing is much smaller. For the values reflected in FIG. 5, for shorter beatlengths, the effect of impulse spacing was more dependent on impulse spacing, while for longer beatlengths, the effect of impulse spacing was substantially independent of impulse spacing.

Figure 6:
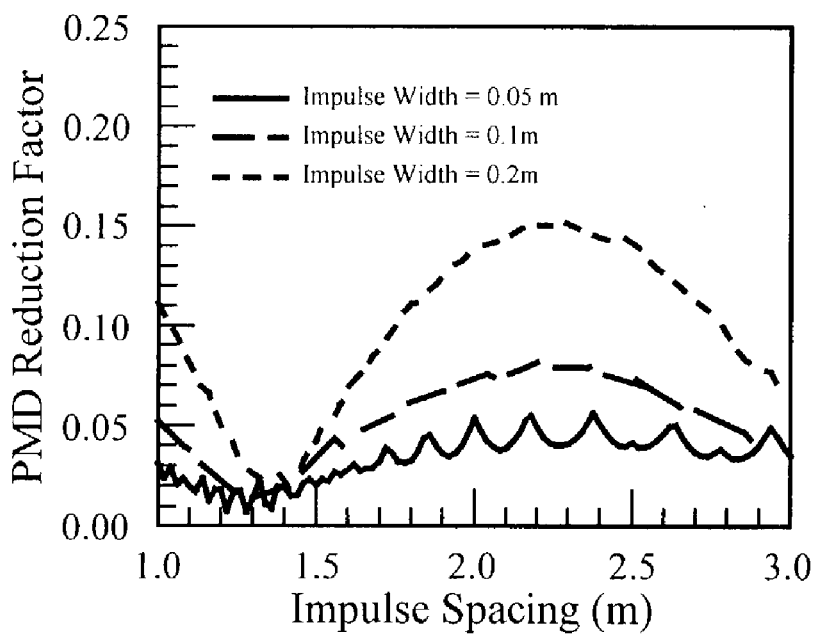
FIG. 6 shows the PMD reduction factor versus impulse spacing for impulse widths of 0.05 m, 0.1 m, and 0.2 m, and a fiber beatlength of 2.0 m, illustrating that a shorter impulse width causes less dependence of PMD reduction factor on impulse spacing.

FIG. 6 shows the PMD reduction factor versus impulse spacing for impulse widths of 0.05 m, 0.1 m, and 0.2 m, and a fiber beatlength of 2.0 m, illustrating that a shorter impulse width causes less dependence of PMD reduction factor on impulse spacing.

Figure 7:
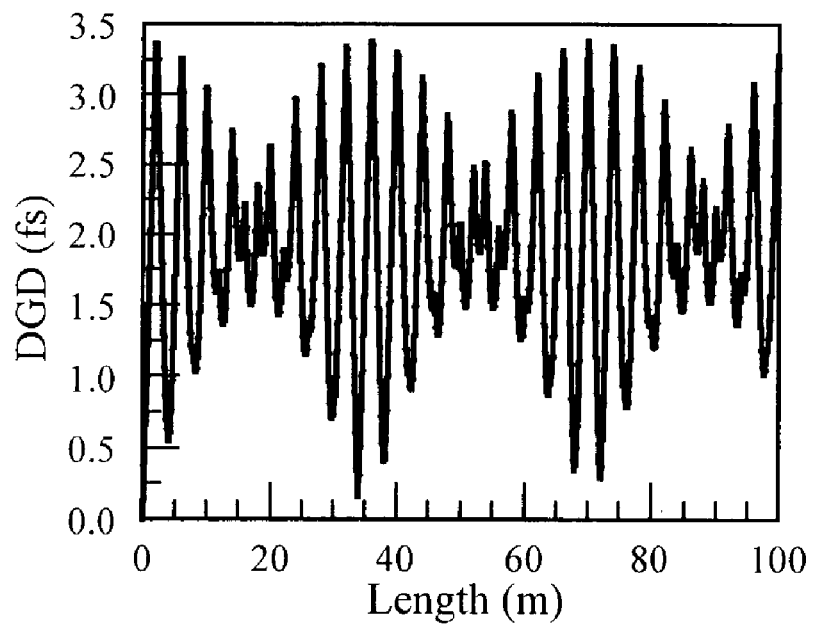
FIG. 7 shows the DGD evolution as a function of length for an impulse width of 0.2 m, a fiber beatlength of 3.0 m, and impulse spacing of 2.0 m.

As illustrated in FIGS. 5 and 6, at certain conditions the PMD reduction factor can reach a value very close to zero, which may be referred to as optimal condition or phase match condition (cf. X. Chen et al, "Polarization mode dispersion of spun fibers: an analytical solution", Optics Letters, vol. 27 (No. 5) 294 (2002)), wherein the DGD evolution as a function of length has bounded value and can be periodic, as illustrated in FIG. 7 for an impulse width of 0.2 m, a fiber beatlength of 3.0 m, and impulse spacing of 2.0 m.

Figure 8:
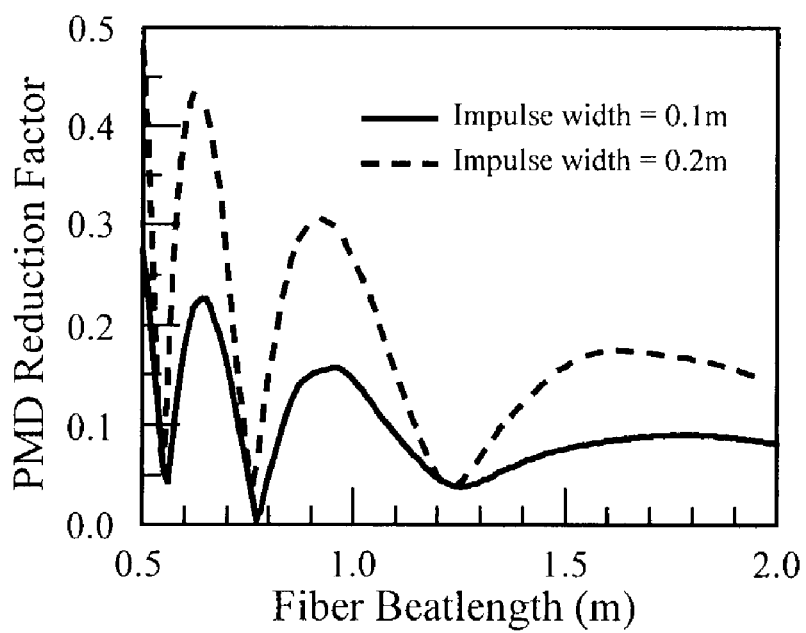
FIG. 8 shows the PMD reduction factor as a function of fiber beatlength for an impulse spacing of 2.0 m and for impulse widths of 0.1 m and 0.2 m, respectively.

FIG. 8 shows the PMD reduction factor as a function of fiber beatlength for an impulse spacing of 2.0 m and for impulse widths of 0.1 m and 0.2 m, respectively.

Figure 9:
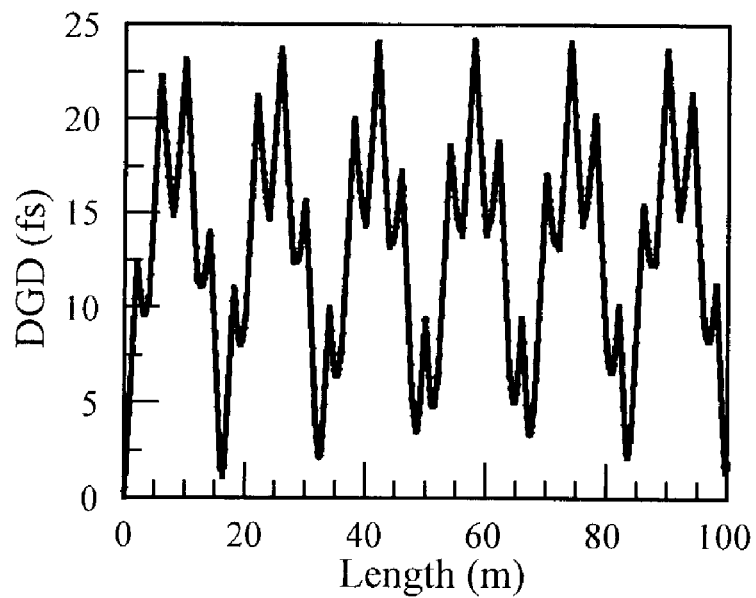
FIG. 9 shows DGD as a function of fiber length corresponding to an optimal impulsive spin profile (here, $R_1=-155°$ and $R_2=75°$).

PMD reduction performance is dependent upon fiber and spin parameters. Impulsive spinning patterns can be adjusted by, for example, generating a pattern at equally spaced location $x_i$ so that $x_i = i*x_0$ ($i=0, 1, \ldots N$) with pre-specified rotation $R_i$ for a fixed width of impulsive spinning. This pattern can then be repeated any number of times. In the simplest case we can choose N to be 2. Optimal maximum spin rates for a fixed impulse width can be determined by scanning through a parameter space. By scanning through rotations between −180 degrees and 180 degrees, the optimal rotations are found to be $R_1 = -155°$, and $R_2 = 75°$ for fixed impulse width of 0.2 m and impulse spacing of 2 m, wherein the resulting PMD is less than 25 femtoseconds (fs) regardless of the length of fiber, a dramatic improvement over the un-optimized case discussed above. FIG. 9 shows DGD (in fs) as a function of fiber length (in meters) corresponding to an optimal impulsive spin profile (here, $R_1 = -155°$ and $R_2 = 75°$). The fiber beatlength was assumed to be 0.8 m. The impulse width was 0.2 m and impulse spacing was 2 m. As shown in FIG. 9, the DGD evolution is bounded in a finite range and thus the PMD reduction factor is essentially zero. Here again, phase matching condition is met.

Table 1 shows the PMD reduction with respect to variations of a fiber parameter (beatlength) and various impulsive spinning parameters (optimal maximum spin rates R1 and R2, impulse width w, and impulse spacing).

TABLE 1

| Fiber Beatlength (m) | R1 (degrees) | R2 (degrees) | w (m) | Spacing (m) | PMD Reduction Factor |
|---|---|---|---|---|---|
| 0.8 | −155 | 75 | 0.2 | 2 | 0.0026 |
| 0.8 | −150 | 75 | 0.2 | 2 | 0.028 |
| 0.8 | −160 | 75 | 0.2 | 2 | 0.021 |
| 0.8 | −155 | 70 | 0.2 | 2 | 0.09 |
| 0.8 | −155 | 80 | 0.2 | 2 | 0.08 |
| 0.8 | −160 | 70 | 0.2 | 2 | 0.076 |
| 0.8 | −160 | 80 | 0.2 | 2 | 0.089 |
| 0.8 | −150 | 70 | 0.2 | 2 | 0.11 |
| 0.8 | −150 | 80 | 0.2 | 2 | 0.075 |
| 0.8 | −155 | 75 | 0.15 | 2 | 0.042 |
| 0.8 | −155 | 75 | 0.25 | 2 | 0.081 |
| 0.8 | −155 | 75 | 0.2 | 1.8 | 0.4 |
| 0.8 | −155 | 75 | 0.2 | 2.2 | 0.42 |
| 0.75 | −155 | 75 | 0.2 | 2 | 0.41 |
| 0.85 | −155 | 75 | 0.2 | 2 | 0.36 |

Table 1 shows that the PMD reduction performance is less sensitive to fluctuations in the amount of rotation and impulse width, but more sensitive to fluctuations in fiber beatlength and impulse spacing. The sensitivity to beatlength and/or impulse spacing can be reduced by, for example, reducing impulse width.

In another set of preferred embodiments, the selected portions are disposed at periodic intervals or regular intervals, and the amount of spin is randomly selected for each selected portion, and/or the spin rate is randomly selected for each selected portion. A quasi-random number generator may be utilized to achieve the random setting. Such an impulsive spinning at each spinning site introduces random mode coupling in a controlled way. Uncontrolled mode coupling behavior has been theoretically modeled in the literature. See for example N. Gisin et al, "Polarization Mode Dispersion of short and long single-mode fibers", Journal of Lightwave Technology, Vol. 9 (No. 7) page 821-827 (1991). Moreover, using the model discussed in the above-mentioned paper by N. Gisin et al., the DGD of a fiber of length l statistically follows the equation, $$\tau(l) = \Delta \cdot \sqrt{\sqrt{h \cdot l}} \tag{8}$$

where $\Delta$ is the DGD in unit length, which is related to fiber beatlength $L_B$, speed of light c and wavelength $\lambda$, $$\Delta = \frac{\lambda}{C \cdot L_B}.$$

In the theoretical model case of N. Gisin et al., h is the mode coupling length, whereas, as disclosed herein, h is the spacing between two consecutive impulsive spinnings, or impulse spacing. In typical fibers, mode coupling length is not a controllable parameter, and is largely determined by the manner in which the fiber is deployed, such as the fiber cabling process. By implementing an impulsive spinning as disclosed herein with a random amount of rotation at each impulsive spinning site and by controlling the spacing between two consecutive spinnings, the mode coupling length can be controlled. In typical fibers with uncontrolled mode coupling, the mode coupling length varies between a few meters to tens of meters. As disclosed herein, the impulsive spinning spacing can be set sufficiently short so as to reduce PMD through the reduced mode coupling length. For example, referring to Equation (8) above, if a fiber mode coupling length is 10 m, and if random impulsive spinning with 1 meter spacing is applied, more than a factor of three improvement on the fiber PMD may be achieved. Because the controlled mode coupling length can be made shorter than the uncontrolled mode coupling length for a deployed fiber, the randomly impulsively spun fibers can be made to be less deployment sensitive, making the fiber PMD performance more predictable.

Figure 10:
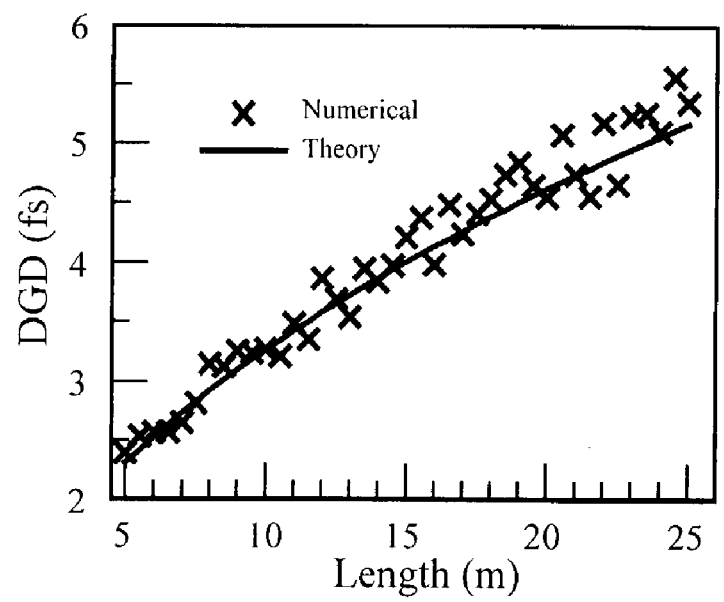
FIG. 10 shows the DGD as a function of fiber length for a fixed fiber mode coupling length of 1.0 m.
Figure 11:
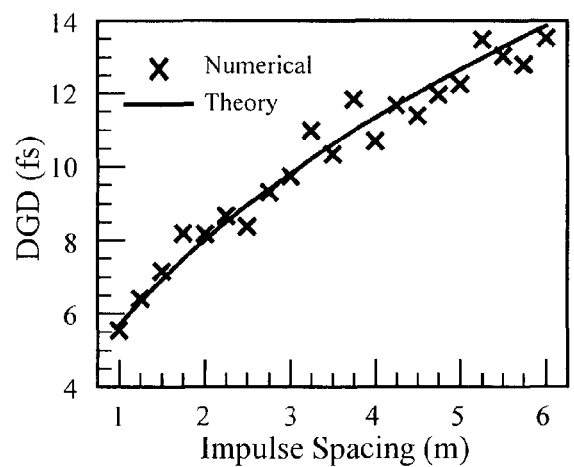
FIG. 11 shows the DGD as a function of fiber mode coupling length for a fixed fiber length of 30 m.

To illustrate, the PMD behavior for fiber made by the random impulsive spinning was compared to the theoretical prediction from Eq.(8) and plotted in FIGS. 10 and 11. The mode coupling length (corresponding to the theoretical) or impulse spacing (as disclosed herein) was chosen to be 1.0 meter, the impulse width is chosen to be 0.2 m. The amount of rotation at each impulsive spinning was randomly chosen from rotations lying between −90 degrees and 90 degrees.

FIG. 10 shows the DGD as a function of fiber length for a fixed fiber mode coupling length of 1.0 m. FIG. 11 shows the DGD as a function of fiber mode coupling length for a fixed fiber length of 30 m. The DGD results are calculated from the quadrature average of DGD over 100 randomly generated instances.

FIGS. 10 and 11 show that the random impulsive spinning yields the behavior predicted by Eq.(8). Thus, the mode coupling length can be shortened by controlling the impulse spacing, thereby reducing the fiber PMD.

Figure 12:
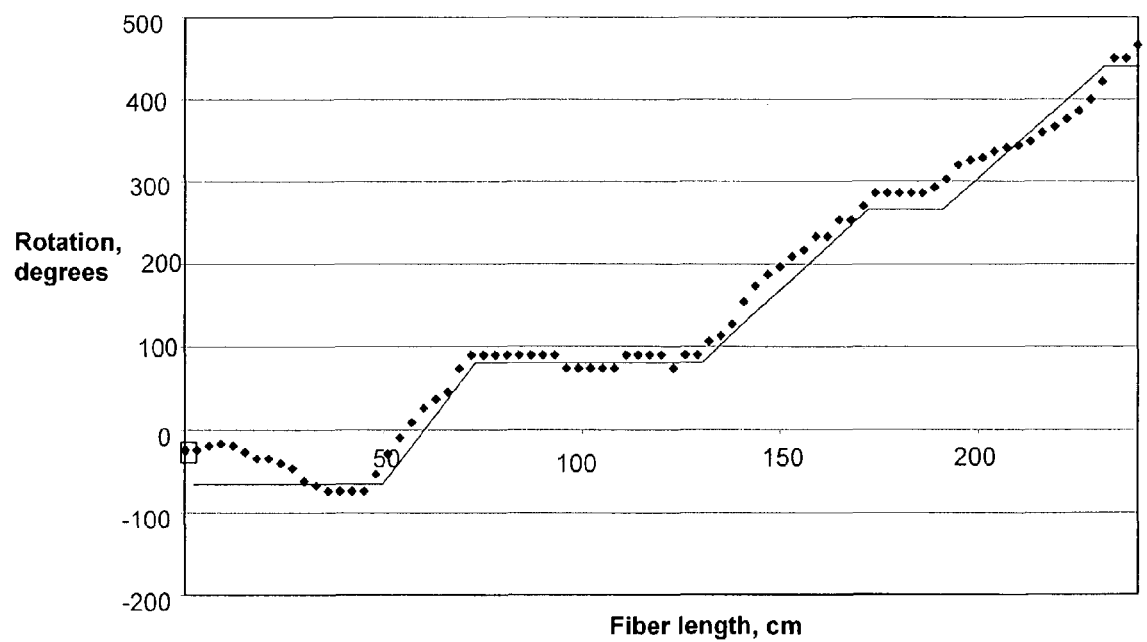
FIG. 12 shows a target spin function (solid line) and measured rotations on a portion of optical fiber impulsively spun as disclosed herein.

FIG. 12 shows the target spin function, represented by a solid line, applied to a 300 cm length of optical fiber during fiber draw at a draw speed of about 3 m/sec. The points on the graph in FIG. 12 indicate measured values of spin on the resulting fiber. As seen in FIG. 12, between about 50 cm and 70 cm, the spin imposed on the fiber was changed from an angle of about −65° to an angle of about +80°, therefore an impulsive spin rate of about 7° per cm or about 2 turns per meter was applied to that selected portion of fiber. At a draw speed of 3 m/s, the corresponding impulse width was about 67 millisecond. Between about 70 cm and about 130 cm, the impulse spin rate was zero and the rotation of the fiber remained substantially constant at about 80°, yielding an impulse spacing of about 60 cm, or at a 3 m/s draw speed, 200 milliseconds between the previous impulse and the next impulse. Between about 130 cm and about 170 cm, the spin imposed on the fiber was changed from an angle of about +80° to an angle of about +270°, therefore an impulsive spin rate of about 5° per cm or about 1.3 turns per meter was applied to that selected portion of fiber. At a draw speed of 3 m/s, the corresponding impulse width was about 133 millisecond. Between about 170 cm and about 190 cm, the impulse spin rate was zero and the rotation of the fiber remained substantially constant at about 280°, yielding an impulse spacing of about 20 cm, or at a 3 m/s draw speed, 67 milliseconds between the previous impulse and the next impulse. Between about 190 cm and about 230 cm, the spin imposed on the fiber was changed from an angle of about +270° to an angle of about +435°, therefore an impulsive spin rate of about 4° per cm or about 1.1 turns per meter was applied to that selected portion of fiber. The corresponding impulse width was about 67 milliseconds.

Figure 13:
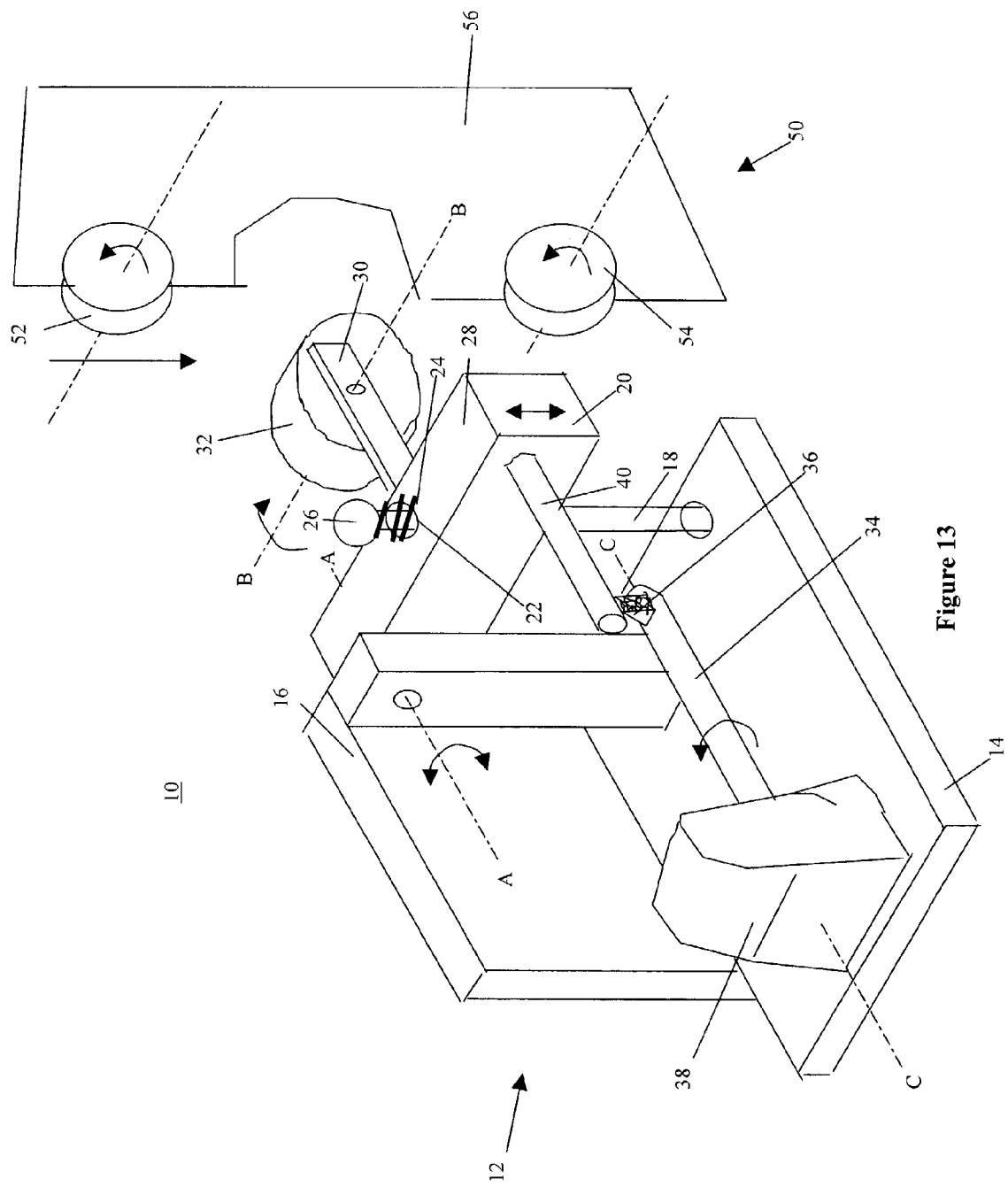
FIG. 13 shows an isometric sketch of an embodiment of an apparatus disclosed herein capable of imparting impulsive spin to an optical fiber as the fiber is being drawn.
Figure 14:
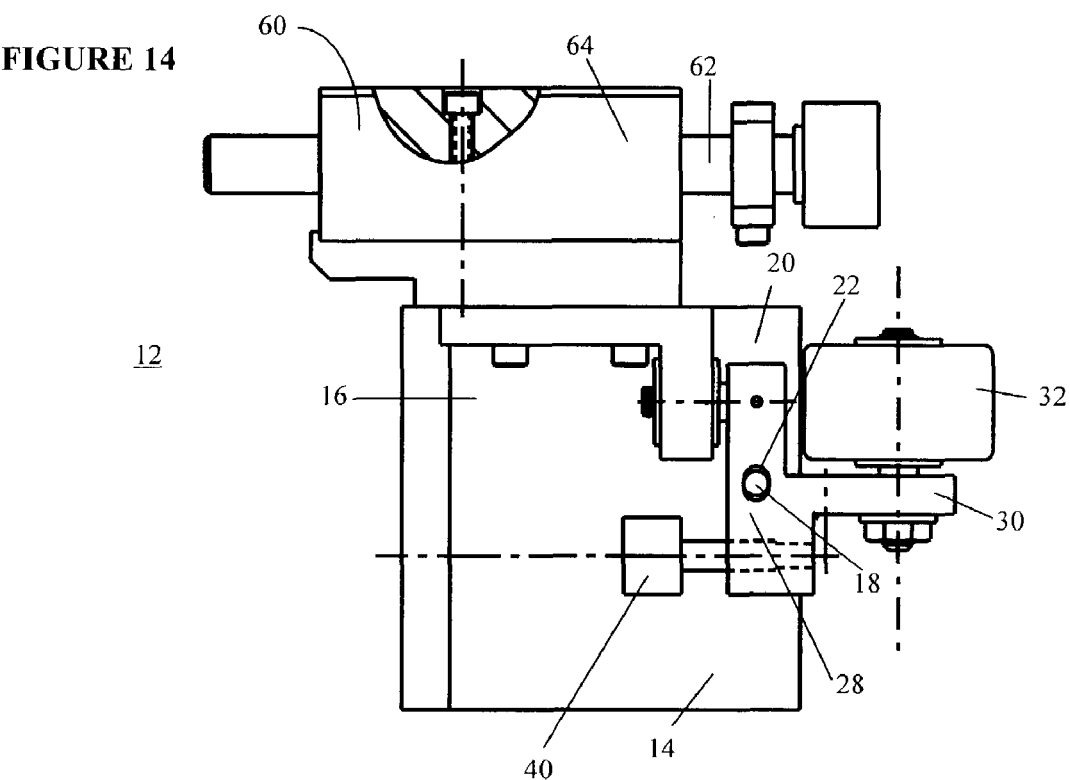
FIG. 14 is a top view of an embodiment of the apparatus as disclosed herein similar to FIG. 13.
Figure 15:
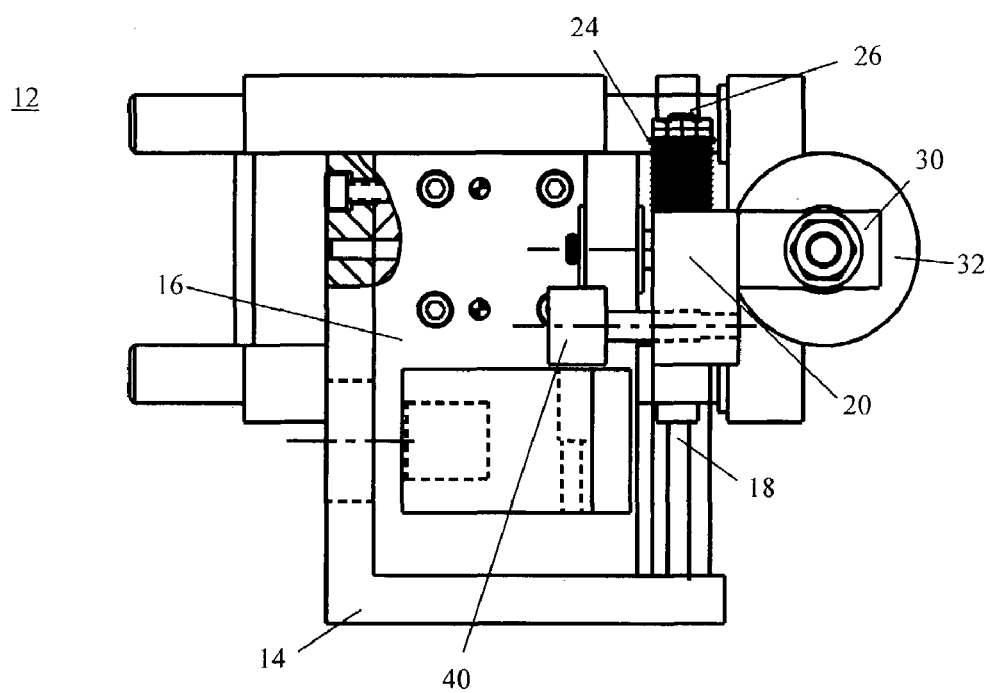
FIG. 15 is a front view of the apparatus of FIG. 14.

FIG. 13 shows an isometric sketch of an embodiment of an apparatus 10 disclosed herein capable of imparting impulsive spin to an optical fiber as the fiber is being drawn. A mount 12 comprises a base member 14 and a support member 16. A rod 18 is attached to the base member and extends therefrom. A lever member 20 is pivotally mounted to the support member such that the lever member 20 is capable of pivoting about axis A-A. The lever member 20 is provided with a throughhole 22 which is adapted to accommodate the rod 18, wherein the throughhole 22 is sized to allow limited pivoting motion of the lever member 20 with respect to axis A-A. Preferably, a biasing member 24, such as the spring shown in FIGS. 13-15, is disposed about a distal portion 26 of the rod 18, wherein the biasing member 24 is capable of contacting the upper portion of the rod 18 and a distal surface 28 of the lever member 20. Other biasing members or means of attachment or engagement between the biasing member 24, the rod 18 and the lever member 20 may be used. A wheel mount 30 is attached to the lever member 20, and a wheel 32 is pivotally mounted to the wheel mount 30 such that the wheel 32 is capable of rotating about axis B-B. The apparatus further comprises a shaft 34, the shaft 34 comprising a cam portion 36 extending above the outer diameter of the remainder of the shaft 34 located at the cross section of the shaft 34 that includes the cam portion 36. The shaft 34 may be driven by a motor 38, such as an electric motor to impart rotation of the shaft 34 about axis C-C. Lever member 20 comprises a follower portion 40, shown as extending parallel to axis C-C and parallel to axis A-A. As the shaft 34 is rotated about axis C-C, the cam portion 36 engages the follower portion 40, causing the lever member 20 to rotate about axis A-A, thereby causing the spring to compress and causing wheel mount 30 and the axis B-B of the wheel 32 to rotate. Thus when the wheel 32 is brought into frictional contact with an optical fiber being drawn, the yaw rotation of the wheel 32 causes the optical fiber to be suddenly, i.e. impulsively, spun.

As the shaft 34 further rotates, the cam portion 36 disengages from the follower portion 40, and the biasing member 24 preferable forces the lever member 20 to rotate about axis A-A in a direction counter to that caused by engagement of the cam portion 36 and the follower portion 40.

The follower portion 40 may engage the remainder of the periphery of the shaft 34 which forms the circumference of the shaft 34 with the cam portion 36, or the follower portion 40 may be disengaged from, or out of contact with, the shaft 34, e.g. a stop member (not illustrated) may be attached to the rod 18 on the side of the lever member 20 opposite to the biasing member 24 which limits the travel of the lever member 20 with respect to the rod 18, such as below the lever member 20 as shown in FIG. 13.

Preferably one or more optical fiber guides are used in combination with the wheel 32. FIG. 13 shows a guide assembly 50 comprising first and second wheels 52, 54 mounted rotatably on a guide support member 56. In use, the guide support member 56 is brought into proximity with the wheel 32 such that the first and second wheels 52, 54 engage an optical fiber and assist in causing contact between the wheel 32 and the fiber.

FIG. 14 is a top view of an embodiment of the apparatus as disclosed herein similar to FIG. 13. The support member 16 of the mount 12 is shown attached to an adjustable traverse support 60, comprising a positioning shaft 62 and a slidable mount 64, for moving the wheel 32 into contact with the fiber. FIG. 14 does not show the distal end of the rod, nor the biasing member. FIG. 15 is a front view of the apparatus of FIG. 14. FIGS. 14 and 15 do not show the shaft with cam portion 36 nor the follower portion 40 of the lever member 20.

Motor 38 may be controlled to help achieve a desired spin profile. For example, motor 38 may be run at a constant speed or at variable speeds. Motor 38 may be run continuously or intermittently. Furthermore, the motor 38 may be driven by a controller comprising a random number generator, or quasi-random number generator, such that the occurrence and/or duration of the rotations of the shaft, and therefore the impulse spin applied to an optical fiber, may be randomly imposed. The randomly selected spin or spin rate provides a reduction in PMD because it mimics the random mode coupling and by controlling the interval, the mode-coupling length can be reduced. Randomly selected spins or spin rates are preferred for optical fibers having the characteristics of longer mode coupling length.

In one embodiment disclosed herein, an optical fiber is imparted with a plurality of simultaneous spin impulses having the same sign, i.e. direction of rotation.

In another embodiment disclosed herein, an optical fiber is imparted with at least two simultaneous spin impulses having the same sign, i.e. direction of rotation.

In another embodiment disclosed herein, an optical fiber is imparted with a plurality of simultaneous spin impulses all having the same sign.

In yet another embodiment disclosed herein, an optical fiber is imparted with a first plurality of simultaneous spin impulses each having a first sign, and a second plurality of simultaneous spin impulses each having a sign opposite to the sign of the first plurality of simultaneous spin impulses.

In still another embodiment disclosed herein, an optical fiber is imparted with a first plurality of simultaneous spin impulses each having a first sign, and a second plurality of simultaneous spin impulses each having a sign opposite to the sign of the first plurality of simultaneous spin impulses, wherein the absolute value of the average rotation of the optical fiber over at least a portion thereof has an average rotation of less than 60°, more preferably less than 30°, even more preferably less than 10°, and still more preferably about 0°.

In another embodiment disclosed herein, an optical fiber is imparted with a plurality of simultaneous spin impulses having alternating signs.

In yet another embodiment disclosed herein, an optical fiber is imparted with a plurality of simultaneous spin impulses having randomly selected signs of rotation.

Figure 16:
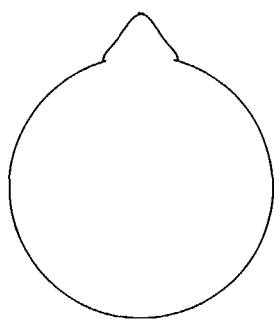
FIG. 16 shows a cross-sectional view of an embodiment of a shaft with a cam portion to be used with the apparatus of FIGS. 13, 14, and/or 15.

FIG. 16 shows a cross-sectional view of an embodiment of shaft with a cam portion for generating spin rates for impulsively spinning an optical fiber. The shaft shown has a generally circular outer surface with a cam portion which is a protrusion.

Figure 17:
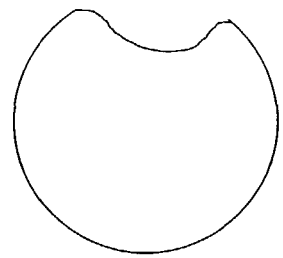
FIG. 17 shows a cross-sectional view of another embodiment of a shaft with a cam portion.

FIG. 17 shows a cross-sectional view of another embodiment of a shaft with a cam portion which is an indentation which can be used to generate spin on an optical fiber in a direction opposite to the spin imposed by a cam portion which is a protrusion.

Figure 18:
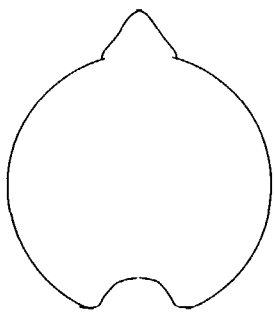
FIG. 18 shows a cross-sectional view of another embodiment of a shaft with a cam portion.

FIG. 18 shows a cross-sectional view of another embodiment of a shaft with a plurality of cam portions, wherein a first cam portion is a protrusion and a second cam portion is an indentation, which can be used to generate spin on an optical fiber in two directions.

Figure 19:
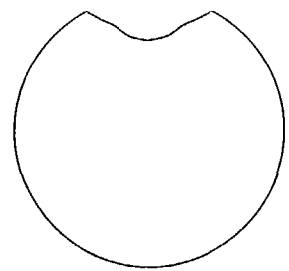
FIG. 19 shows a cross-sectional view of another embodiment of a shaft with a cam portion.

FIG. 19 shows a cross-sectional view of another embodiment of a shaft with a cam portion which is an indentation.

Thus, the rotatable shaft comprises a longitudinal section having a periphery comprised of the cam portion and a generally constant diameter portion, wherein the cam portion has a variable diameter.

In another preferred embodiment, the cam portion comprises an indentation having a diameter less than the diameter of the generally constant diameter portion.

In another preferred embodiment, the rotatable shaft comprises a plurality of cam portions. In yet another preferred embodiment, the plurality of cam portions comprises at least one protrusion and at least one indentation.

In some preferred embodiments, the angle subtending the cam portion in a plane perpendicular to the axis of the rotatable shaft is not greater than 45 degrees.

The rotational speed of the rotatable shaft and/or the width of the cam portion can be selected to adjust the impulse width. The height of the cam portion, or depth of the cam portion (relative to the remainder of the periphery of the rotatable shaft at a transverse section of the shaft containing the cam portion, which preferably has a generally constant diameter) can be selected to adjust the magnitude of the impulse spin. Furthermore, the shape, or profile, of the cam portion can be selected to achieve a desired impulse shape or spin profile shape.

In a preferred embodiment and disclosed herein, an apparatus for impulsively spinning optical fiber comprises a frictional contact member, preferably a wheel, mounted to a lever member. The lever member is pivotally attached to a mount. The lever member comprises a follower portion adapted to engage a cam portion of a rotatable shaft. Rotation of the shaft causes the cam portion to come into and out of engagement with the follower portion of the lever member, thereby causing the axis of the wheel to pivot generally within the arc through which the lever member pivots. During the draw process, i.e. as an optical fiber is being drawn, the wheel is preferably brought into frictional engagement with the optical fiber such that the axis of rotation of the wheel is preferably perpendicular to the longitudinal axis, and the direction of travel, of the optical fiber traveling therepast. A motor drives the shaft, and preferably the motor includes, or is driven by, a controller, wherein the shaft is driven according to a selected rotation or series of rotations.

In one preferred set of embodiments, the method disclosed herein relates to a method of producing an optical fiber from an optical fiber preform, the optical fiber having a beat length, $L_B$, and a longitudinal axis, z, the method comprising the steps of: (a) drawing a first portion of fiber of length $L_1$ from the optical fiber preform and imparting a spin $\theta_1(z)$ to the first portion at an angular speed $\theta'_1(z)$; (b) drawing a second portion of fiber of length $L_2$ immediately adjacent to the first portion and imparting a spin $\theta_2(z)$ to the second portion, the spin $\theta_2(z)$ being imparted at an angular speed $\theta'_2(z)$ having a maximum angular speed $\theta'_{2,MAX} > 0$, wherein $L_2 < 0.1\ L_B$, wherein $L_1 > 2L_2$, and wherein $|\theta'_{2,MAX} - \theta'_3(z)| > 0.5$ turns/meter for any z in the first portion; and drawing a third portion of fiber of length $L_3$ immediately adjacent to the second portion and imparting a spin $\theta_3(Z)$ to the third portion at an angular speed $\theta'_3(z)$, wherein $L_3 > 2L_2$, and wherein $|\theta'_{2,MAX} - \theta'_3(z)| > 0.5$ turns/meter for any z in the third portion. Preferably, the method further comprises repeating steps (a) through (c). In one preferred embodiment, $\theta 1(z)$ is a constant spin angle. In another preferred embodiment, $\theta_1(z)=0$, that is, there is no spin in the first portion. Thus, $\theta'_{1,MAX}(z)$ may be 0. In another embodiment, $\theta_3(Z)$ is a constant spin angle. In yet another preferred embodiment, $\theta_3(Z)=0$, that is, there is no spin in the third portion. Thus, $\theta \zeta_{3,MAX}(Z)$ may be 0.

Figure 20:
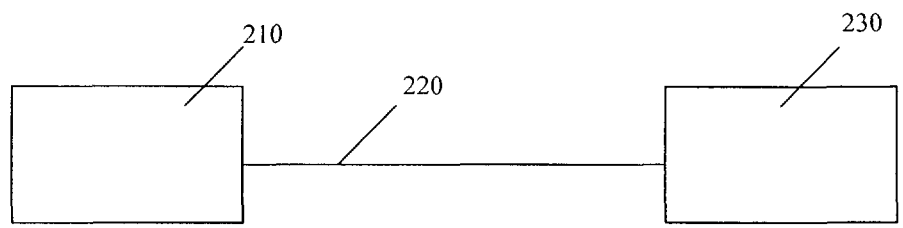
FIG. 20 is an optical fiber communication system comprising an optical fiber as disclosed herein.

As shown in FIG. 20, an optical fiber communication system 200 comprises an optical fiber 220 as disclosed herein. System 200 includes a transmitter 210 and a receiver 230, wherein optical fiber 220 allows transmission of an optical signal between transmitter 210 and receiver 230. System 200 is preferably capable of 2-way communication, and transmitter 210 and receiver 230 are shown for illustration only. The system 200 preferably includes a link which has a section or a span of optical fiber as disclosed herein. The system 200 may also include one or more optical devices optically connected to one or more sections or spans of optical fiber as disclosed herein, such as one or more regenerators, amplifiers, or dispersion compensating modules. In at least one preferred embodiment, an optical fiber communication system according to the present invention comprises a transmitter and receiver connected by an optical fiber without the presence of a regenerator therebetween. In another preferred embodiment, an optical fiber communication system according to the present invention comprises a transmitter and receiver connected by an optical fiber without the presence of an amplifier therebetween. In yet another preferred embodiment, an optical fiber communication system according to the present invention comprises a transmitter and receiver connected by an optical fiber having neither an amplifier nor a regenerator nor a repeater therebetween.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of optical fiber.

The system preferably further comprises at least one amplifier, such as a Raman amplifier, optically coupled to the optical fiber section.

The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm.

In some preferred embodiments, the system is capable of operating in a coarse wavelength division multiplex mode wherein one or more signals propagate in at least one, more preferably at least two of the following wavelength regions: the 1310 nm window, the 1383 nm window, the S-band, the C-band, and the L-band.

In one preferred embodiment, the system operates at less than or equal to about 1 Gbit/s. In another preferred embodiment, the system operates at less than or equal to about 2 Gbit/s. In yet another preferred embodiment, the system operates at less than or equal to about 10 Gbit/s. In still another preferred embodiment, the system operates at less than or equal to about 40 Gbit/s. In yet another preferred embodiment, the system operates at greater than or equal to about 40 Gbit/s.

We have found that fibers subjected to impulsive spinning as disclosed herein can exhibit different characteristics, such as the PMD reduction factor of fibers drawn with such profiles as well as PMD reduction performance with process variations and fiber beatlength variations, as compared to known spinning techniques, for example those techniques which typically apply sinusoidal spin profiles spinning to fibers being drawn continuously. For example, the PMD reduction performance from known sinusoidal spin profiles is very sensitive to small fluctuations of spin parameters such as spin magnitude. Impulsive spinning as disclosed herein can be more effective and less sensitive to process variations as compared to known spin profiles.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. A method of producing an optical fiber from an optical fiber preform, the method comprising:

drawing the optical fiber from the optical fiber preform, the optical fiber comprising a plurality of optical fiber sections, each of said sections comprising (a) a first length of optical fiber, (b) a second length of optical fiber having a first end and an opposing second end, the first end immediately adjacent to the first length, and (c) a third length of optical fiber immediately adjacent to the second end of the second length, wherein the second length is less than one-fifth a beat length of the fiber at a wavelength between 1260 nm and 1625 nm, wherein the first length is greater than twice the second length, wherein the third length is greater than twice the second length, wherein all of the first length has a first constant spin, and, wherein all of the third length has a second constant spin; and imparting a spin to the second length while drawing the optical fiber from the optical fiber preform, wherein the spin to the second length comprises (a) the first constant spin at the first end and (b) the second constant spin at the second end, wherein at least part of the spin to the second length is imparted with a nonzero angular speed having a magnitude greater than 0.5 turns/meter.

2. The method of claim 1 wherein the magnitude of the nonzero angular speed of the spin imparted to the second length is greater than 1 turn/meter.

3. The method of claim 1 wherein each of the first and third lengths is less than 100 times the second length.

4. The method of claim 1 wherein each of the first and third lengths is less than 20 meters.

5. The method of claim 1 wherein the second length is less than 0.5 meter.

6. The method of claim 1 wherein the second length is less than one-tenth the beat length of the fiber.

7. The method of claim 1 wherein the magnitude of the nonzero angular speed of the spin imparted to the second length is greater than 2 turns/meter.

8. The method of claim 1 wherein the magnitude of the nonzero angular speed of the spin imparted to the second length is greater than 2.5 turns/meter.

9. The method of claim 1 wherein at least two of the second lengths are spaced apart by at least 0.5 meters.

10. The method of claim 1 wherein the optical fiber has a mode coupling length less than about 10 meters.

11. The method of claim 1 wherein the optical fiber has a mode coupling length less than about 5 meters.

* * * * *